United States Patent
Kato et al.

(10) Patent No.: US 7,779,264 B2
(45) Date of Patent: Aug. 17, 2010

(54) AUTHENTICATION APPARATUS, AUTHENTICATION METHOD AND AUTHENTICATION COMPUTER PROGRAM PRODUCT

(75) Inventors: Noriji Kato, Kanagawa (JP); Masahiro Maeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1243 days.

(21) Appl. No.: 11/151,207

(22) Filed: Jun. 14, 2005

(65) Prior Publication Data

US 2006/0093145 A1    May 4, 2006

(30) Foreign Application Priority Data

Nov. 4, 2004    (JP)    ............... 2004-321019

(51) Int. Cl.
G06F 21/00    (2006.01)
(52) U.S. Cl. ...................................... 713/182
(58) Field of Classification Search ................. 713/186, 713/182, 168; 382/115, 118, 128; 380/264; 726/27
See application file for complete search history.

(56) References Cited

U.S. PATENT DOCUMENTS

| 6,421,453 | B1 * | 7/2002 | Kanevsky et al. | 382/115 |
| 2004/0024709 | A1 * | 2/2004 | Yu et al. | 705/43 |
| 2004/0190758 | A1 * | 9/2004 | Doi et al. | 382/115 |

FOREIGN PATENT DOCUMENTS

JP    A 2002-111924    4/2002

* cited by examiner

Primary Examiner—Emmanuel L Moise
Assistant Examiner—Ali S Abyaneh
(74) Attorney, Agent, or Firm—Oliff & Berridge, PLC

(57) ABSTRACT

An operation of an authentication apparatus is as follows: Moving image data including a plurality of pieces of still image frame data is accepted, and the move locus of at least one person image is detected based on the moving image data. Individual determination processing of adopting at least one piece of the still image frame data as attention frame data and determining the individual corresponding to the detected move locus of the person image in the attention frame data is executed. The result of the individual determination processing is provided for predetermined authentication processing.

6 Claims, 3 Drawing Sheets

AUTHENTICATION APPARATUS, AUTHENTICATION METHOD AND AUTHENTICATION COMPUTER PROGRAM PRODUCT

BACKGROUND OF THE INVENTION

1. Field of the Invention

This invention relates to an authentication apparatus used for authenticating the user of an information processing machine, etc.

2. Description of the Related Art

In recent years, the unauthorized use of an information processing machine has been socially at stake, and the management burden of personal information concerning authentication such as the user name and the password has grown. Against this backdrop, patent document 1 discloses an art of using an image processing technology to authenticate an individual based on the face image in a copier and permitting only the registered user to use the machine. According to the art, information that can be stolen such as the user name and the password is not used and thus the art has the advantage that it makes it possible to reduce the information management burden, etc. (Please see JP-A-2002-111924)

SUMMARY OF THE INVENTION

However, in the authentication method in the related art, the person who wants to use the copier must assume a given posture in front of a camera, etc., to pick up a face image for authentication; the related art involves a problem of low convenience.

It is therefore an object of the invention to provide an authentication apparatus for making it possible to increase convenience.

According to one aspect of the invention, there is provided an authentication apparatus including: a first unit accepting moving image data having a plurality of pieces of still image frame data; a detection unit detecting a move locus of at least one person image based on the moving image data; and a second unit executing individual determination processing of adopting at least one piece of the still image frame data as attention frame data and determining the individual corresponding to the detected move locus of the person image in the attention frame data. A result of the individual determination processing is provided for predetermined authentication processing.

Thus, at least one person whose image is picked up is tracked in the moving image, the individual relating to the image of each person is determined, and the determination result is used for authentication processing, so that the user need not assume a given posture in front of a camera, and convenience can be increased.

The detection unit may detect at least one moving body from the moving image data and may detect the move locus of the moving body satisfying a predetermined condition, of the detected moving bodies as the move locus of the person image or may detect the move locus of the person image based on color information.

The authentication apparatus may further include a third unit detecting the face portion of a person from at least a part of the plurality of pieces of still image frame data. The detection unit may detect the move locus of the person image based on the detected face portion information.

According to another aspect of the invention, there is provided an authentication method for causing a computer to execute the steps of accepting moving image data including a plurality of pieces of still image frame data; detecting the move locus of at least one person image based on the moving image data; and executing individual determination processing of adopting at least one piece of the still image frame data as attention frame data and determining the individual corresponding to the detected move locus of the person image in the attention frame data. The result of the individual determination processing is provided for predetermined authentication processing.

According to still another aspect of the invention, there is provided an authentication program for causing a computer to execute the steps of accepting moving image data including a plurality of pieces of still image frame data; detecting the move locus of at least one person image based on the moving image data; and executing individual determination processing of adopting at least one piece of the still image frame data as attention frame data and determining the individual corresponding to the detected move locus of the person image in the attention frame data. The result of the individual determination processing is provided for predetermined authentication processing.

DESCRIPTION OF THE PREFERRED EMBODIMENTS

Figure 1:
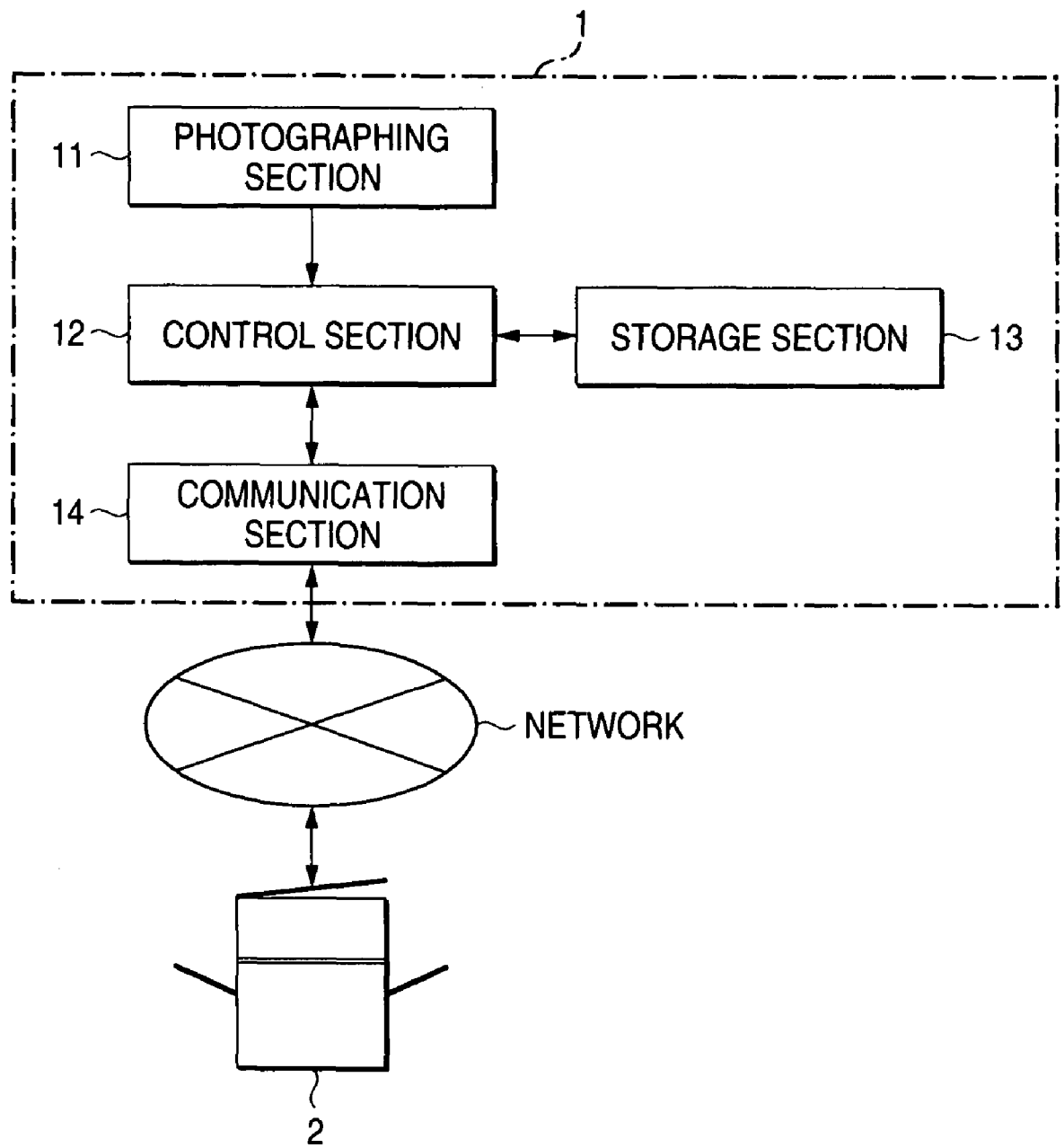
FIG. 1 is a block diagram to show the configuration of an authentication apparatus according to an embodiment of the invention.

Referring now to the accompanying drawings, there is shown a preferred embodiment of the invention. An authentication apparatus 1 is connected to a copier 2 as an information processing machine requiring authentication through a network.

The authentication apparatus 1 is made up of an image pickup section 11, a control section 12, a storage section 13, and a communication section 14.

The image pickup section 11 is placed at a location where it can pick up an image of at least the person who wants to use the copier. The image pickup section 11 is a CCD camera, etc., for example, and outputs picked-up moving image data to the control section 12. The moving image data is a set of pieces of still image frame data. Frame numbers starting at 1 in the time sequence are associated with the pieces of still image frame data.

The control section 12 is a CPU, etc., and operates in accordance with a program stored in a computer readable medium, such as in the storage section 13. In the embodiment, the control section 12 accepts the moving image data input from the image pickup section 11 and stores the moving image data in the storage section 13. The control section 12 detects a moving body from the accepted moving image data and executes individual determination processing of determining who each moving body as a person candidate is (assuming that the moving body is a person). Further, upon reception of an authentication request through the network from the copier 2, the control section 12 transmits the information relating to the result of the individual determination processing to the copier 2 of the requester in response to the authentication request.

The storage section 13 is made up of a storage device such as RAM (Random Access Memory) and a disk device such as a hard disk. The storage section 13 stores the program executed by the control section 12. The storage section 13 also operates as work memory of the control section 12.

The communication section 14 is a network card, etc., and is connected to an information processing machine requiring authentication (here, the copier 2) through the network. The communication section 14 transmits various pieces of data to the copier 2 in accordance with an instruction input from the control section 12. When various pieces of data of an authentication request, etc., come from the copier 2, the communication section 14 receives the data and outputs the data to the control section 12.

Figure 2:
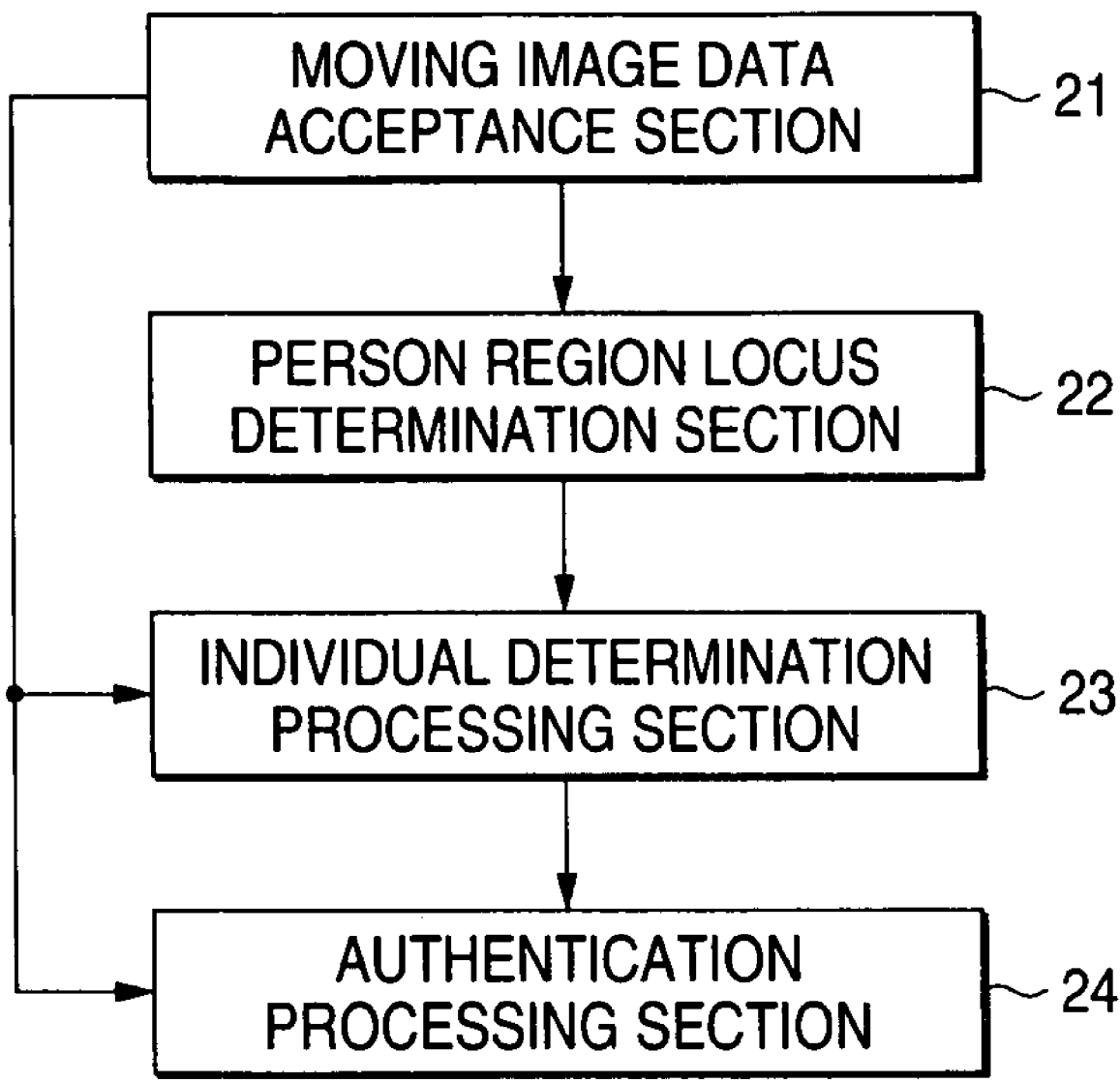
FIG. 2 is a functional block diagram of the authentication apparatus according to the embodiment of the invention.

Next, the processing executed by the control section 12 will be discussed. The processing is made up of functions of a moving image data acceptance section 21, a person region locus determination section 22, an individual determination processing section 23, and an authentication processing section 24, as shown in FIG. 2.

The moving image data acceptance section 21 accepts moving image data input from the image pickup section 11 and stores the moving image data in the storage section 13.

The person region locus determination section 22 detects the move locus of at least one person image based on the moving image data. As the processing of the person region locus determination section 22, (1) method of using an optical flow, (2) image recognition method of the face portion of a person, and (3) method of using the flesh color of a person are available. The methods are described later.

The individual determination processing section 23 adopts at least one piece of still image frame data contained in moving image data as attention frame data, determines the region corresponding to the move locus of a person image in the attention frame data, and determines the individual whose image is picked up in the determined region. In the embodiment, for example, the face portion is determined according to a method disclosed in JP-A-2003-281541 (if the face portion is already detected in the person region locus determination section 22, the region information of the face portion is used intact). Based on the image contained in the determined face portion, the three-dimensional shape of the face contained in the image is made approximate using a combination of plane patches. The plane patches are characterized by the three-dimensional amount.

In the embodiment, the three-dimensional amount of a plurality of plane patches, previously calculated on the face of each person to be authenticated is retained in the storage section 13. A comparison is made between the three-dimensional amount of a plurality of plane patches concerning the face whose image is picked up in the attention frame data and the retained three-dimensional amount of a plurality of plane patches concerning the face of each person, and individual determination information to determine the individual is output. If the individual cannot be determined (if the person whose image is picked up is not retained as the object to be authenticated), the individual determination processing section 23 outputs individual determination information representing that the person is unknown.

For the operation of the person region locus determination section 22, (1) method of using an optical flow, (2) image recognition method of the face portion of a person, and (3) method of using the flesh color of a person will be discussed below in order:

First, (1) method of using an optical flow will be discussed. In the optical flow, attention is focused on one piece of the still image frame data contained in the moving image data to be processed (here, kth still image frame data), and a plurality of blocks are defined in the kth still image frame data. Likewise, a plurality of blocks are also defined in the k+1st still image frame data.

The blocks may be placed overlapping each other. For example, an 8×8-pixel block may be arranged while being shifted four pixels at a time (from left to right (side to side) and from line to line) in the scan line direction (scan order in which one line is scanned from left to right and when the right end is reached, move is made to the line below that line).

The person region locus determination section 22 adopts one of the blocks in the kth still image frame data as a reference block, calculates the pixel brightness difference between the reference block in the kth still image frame data and each block in the k+1st still image frame data, and finds the sum total. The value of the sum total is stored in association with each block.

The block with which the minimum sum total is associated is determined among the blocks in the k+1st still image frame data, and the line connecting the center pixel of the determined block in the k+1st still image frame data from the center pixel of the reference block in the kth still image frame data is adopted as rate vector.

Next, the rate vector when each block in the kth still image frame data is adopted as a reference block (rate vector corresponding to each block) is found and a group of blocks with the difference between the rate vectors corresponding to the adjacent blocks being less than a predetermined threshold value is determined.

The block group can be determined by giving the identifier to each block. That is, one of blocks to which no identifier is given is selected as the attention block and a unique identifier is given to the block. A block to which no identifier is given, of the adjacent blocks to the attention block is determined an object block. A comparison is made between the rate vector corresponding to the attention block and the rate vector of the object block. If the difference therebetween (the square sum of the differences between the elements of the rate vectors may be adopted) is less than a predetermined threshold value, the object block is given the same identifier as the attention block. If the difference between the rate vectors is equal to or greater than the predetermined threshold value, no identifier is given. With each object block as the attention block, the processing is continued until the object block is not found.

If the object block is not found, processing of searching for each block to which no identifier is given and selecting the found block as the attention block is repeated. When the identifiers are thus given to all blocks, the person region locus determination section 22 checks the number of blocks contained in the block group for each block group to which the same identifier is given. If the number of blocks is within a predetermined block number range, the corresponding block group is determined a person. According to the method, whether or not the block group is a person is determined based on the size of the moving body from among moving bodies. The pixel group corresponding to the block group determined a person is adopted as the person image portion and the region information determining the pixel group corresponding to the kth still image frame data is stored in the storage section 13.

The person region locus determination section 22 repeats the processing for each still image frame. Accordingly, the information concerning a sequence of regions where it is determined that a person image is picked up is stored in the storage section 13 in association with each still image frame data.

In (2) image recognition method of the face portion of a person, image recognition of the face portion is conducted from each still image frame data contained in moving image data, and information determining the recognition position of each face portion is generated. Next, one of the recognition positions of the face portion in any kth still image frame is adopted as the attention face portion, and the face portion recognition position in the k+1st still image frame with the smallest difference between each of the face portion recognition positions in the k+1st still image frame and the recognition position of the attention face portion (the nearest recognition position) is selected. The information representing the recognition position of the attention face portion in the kth still image frame and the information representing the recognition position selected in the k+1st still image frame are stored in the storage section 13 in association with each other. Likewise, the recognition position selected in k+1st still image frame is adopted as the attention face portion, and the face portion recognition position in the k+2nd still image frame with the smallest difference between each of the face portion recognition positions in the k+2nd still image frame and the recognition position of the attention face portion (the nearest recognition position) is selected. The information representing the recognition position of the attention face portion in the k+1st still image frame and the information representing the recognition position selected in the k+2nd still image frame are stored in the storage section 13 in association with each other. Accordingly, the move locus of the position coordinates of the face portion of the person in the moving image data is stored in the storage section 13.

The face determination processing will be discussed. The person region locus determination section 22 may, for example, convert each still image frame contained in the moving image data to gray scale data and then extract the portion corresponding to the person face from the image data using a first learning database learning the person face. At this time, after the face portion is determined by a predetermined method, the image of the face upright and viewing the front (normal image) and a plurality of face images provided by rotating the face right and left each at a predetermined angle from the normal image may be provided, the image of the face portion may be converted into an approximate image to the normal image (normalization) using a second learning database learning the face images, and whether or not the post-normalized image data is the face image may be determined using the information in the first learning database. Accordingly, if the person face image is picked up from any angle, face search can be made based on the learning result of the face viewing the front.

Further, to use (3) method of using the flesh color of a person (namely, color information), a pixel in a predetermined flesh color range is selected in any kth still image frame. Specifically, the pixel value of each pixel of the image data of a still image frame is converted into the hue component value. The flesh color range is preset as the hue value range (upper limit value Hmax and lower limit value Hmin).

The person region locus determination section 22 reserves a data area of the same size as a still image frame in the storage section 13, and each value in the data area (assuming that the value is a 1-bit value) is initialized to "0." The value in the data area corresponding to the pixel contained in the kth still image frame and having the value (hue component value) in the flesh color range of the lower limit value Hmin to less than the upper limit value Hmax is set to "1." Accordingly, the data representing the area of the color corresponding to the flesh color in the kth still image frame is generated in the storage section 13.

The person region locus determination section 22 performs processing (labeling processing) of associating different label values with continuous areas with the value "1" in the data area (portion surrounded by values of "0"). The person region locus determination section 22 determines that the portion of the pixel lump of a predetermined threshold value or more, of the pixel lumps provided by performing the labeling processing is the portion corresponding to the person. The specific method of the labeling processing is well known and therefore will not be discussed again in detail here.

Likewise, the person region locus determination section 22 also generates a data area for the k+1st still image frame and performs labeling processing and determines the portion corresponding to the person. Next, the person region locus determination section 22 calculates the center of gravity of each portion determined the portion corresponding to the person (for each portion, average of the positions of the pixels contained in each portion) in the kth still image frame and the center of gravity of each portion determined the portion corresponding to the person in the k+1st still image frame.

One of the portions determined the portion corresponding to the person in the kth still image frame is adopted as the attention portion, and the portion determined the portion corresponding to the person in the k+1st still image frame with the smallest difference between the position of the center of gravity of each portion and the position of the center of gravity of the attention portion (the nearest portion) is selected. The information representing the label value of the attention portion in the kth still image frame and the information representing the label value corresponding to the position of the center of gravity selected in the k+1st still image frame are stored in the storage section 13 in association with each other. Similar processing is repeated inductively for each of the k+2nd, k+3rd . . . still image frames.

Accordingly, the move locus of the regions of the flesh color portion of the person in the moving image data is stored in the storage section 13. That is, each region where the person image is picked up in each still image frame is labeled and when one of the persons is adopted at the attention person, a series of label numbers for each still image frame involved in the attention person is stored in association with each other. That is, the move locus for each person is represented by a series of label numbers and the information determining the region corresponding to the label number (pixel lump in the data area).

The person region locus determination section 22 has been described about examples of separately using (1) method of using an optical flow, (2) image recognition method of the face portion of a person, and (3) method of using the flesh color of a person. However, for example, two or more methods may be used in combination in such a manner that the method of using an optical flow and the image recognition method of the face portion are used in combination so that the region recognized as the person region by performing the optical flow processing wherein no face portion is recognized is not determined the person region.

Figure 3A:
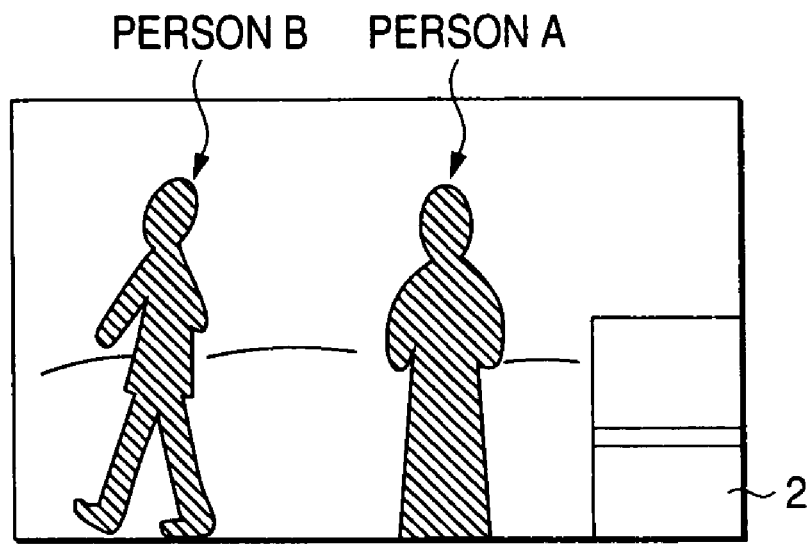
FIG. 3 is a drawing to represent an operation example of the authentication apparatus according to the embodiment of the invention.
Figure 3B:
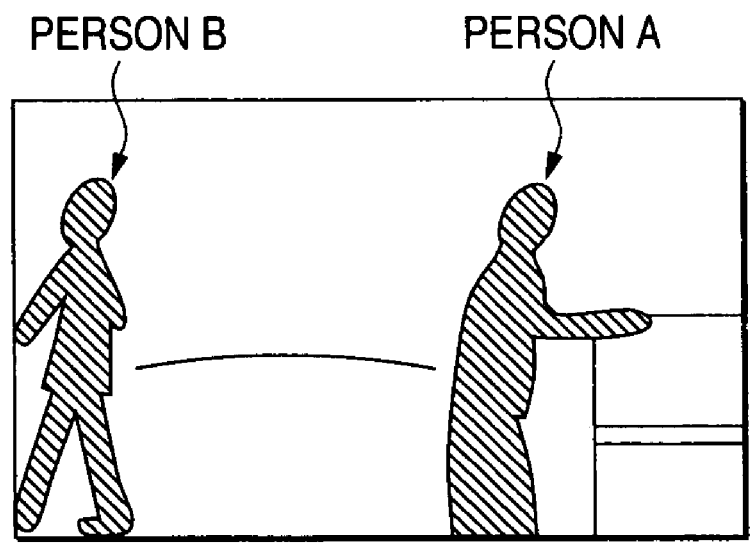

Thus, in the embodiment, the person region locus determination section 22 determines the move locus for each person. Conceptually, when one of the persons whose images are picked up is adopted as the attention person as the move locus is determined, the region where the attention person image is picked up is determined for each still image frame. For example, as shown in FIG. 3, if images of persons A and B are picked up, it is made possible to distinguish between the persons A and B in each still image frame.

The control section 12 in the embodiment recognizes the move locus for each portion where it is determined that a person image is picked up by the method described above in the moving image data picked up in the image pickup section 11. The control section 12 determines the region corresponding to the move locus of at least one person image from at least one piece of the still image frame data contained in the moving image data, and determines the individual whose image is picked up in the determined region.

Accordingly, it is made possible for the control section 12 to associate the information determining each individual with the information of the recognized move locus (a sequence of pieces of information determining the corresponding regions in a sequence of still image frames). That is, the control section 12 stores the individual determination information determining each individual in the storage section 13 in association with the move locus information. In the example in FIG. 3, the individual determination information about the person A and that about the person B are stored in association with the move locus information.

Upon reception of an authentication request from the copier 2 as an information processing machine requiring authentication, the authentication processing section 24 acquires the position where an image of the copier 2 of the requester is picked up (authentication request position) in the moving image data picked up in the image pickup section 11. Specifically, the information of the authentication request position may be previously stored in the storage section 13 in association with the information determining the copier 2.

The authentication processing section 24 selects the region nearest to the authentication request position from among the regions corresponding to each move locus, contained in the still image frame picked up at the point in time of the authentication request (for example, the region whose center of gravity is nearest to the authentication request position) (for example, the person A in FIG. 3(*b*)).

The authentication processing section 24 acquires the individual determination information stored in the storage section 13 in association with the move locus information corresponding to the selected region. The authentication processing section 24 determines whether or not the acquired individual determination information is the information representing an unknown person. If it is the information representing an unknown person, the authentication processing section 24 transmits information representing that the authentication results in failure to the copier 2 of the authentication requester. If the acquired individual determination information is not the information representing an unknown person, the authentication processing section 24 transmits information representing that the authentication is successful to the copier 2 of the authentication requester.

Here, it is assumed that only the copier 2 is the information processing machine requiring authentication, but images of two or more information processing machines requiring authentication may be picked up in the moving image data. In this case, for each information processing machine, the authentication request position information may be stored in the storage section 13 and the control section 12 may read the authentication request position information relating to the information processing machine of the authentication requester from the storage section 13 and may select the region nearest to the authentication request position from among the regions corresponding to each move locus, contained in the still image frame picked up at the point in time of the authentication request.

Further, when an authentication request is made, the information indicating whether or not the authentication is successful. However, if at least one of the regions corresponding to the move locus comes close within a predetermined distance range for the attention position of the preset authentication request positions, the individual determination information stored in the storage section 13 in association with the move locus information corresponding to the close region may be acquired and the acquired individual determination information may be transmitted to the information processing machine corresponding to the attention position. Accordingly, the information processing machine can perform processing of receiving mail addressed to the individual determined by the individual determination information and presenting the mail to the individual, for example.

Thus, according to the embodiment, the move locus of each person is recognized and tracked from the moving image data and the individual corresponding to each move locus is identified. Later, when an authentication request is received from an information processing machine, authentication processing in the information processing machine is performed using the information concerning the individual existing in the region nearest to the image pickup position of the information processing machine. In the processing, if the individual can be determined, it may be determined that the authentication is successful, or the information determining the individual may be transmitted to the authentication requester for performing authentication processing.

FIG. 1
11 PHOTOGRAPHING SECTION
12 CONTROL SECTION
13 STORAGE SECTION
14 COMMUNICATION SECTION
A. NETWORK

FIG. 2
21 MOVING IMAGE DATA ACCEPTANCE SECTION
22 PERSON REGION LOCUS DETERMINATION SECTION
23 INDIVIDUAL DETERMINATION PROCESSING SECTION
24 AUTHENTICATION PROCESSING SECTION

What is claimed is:

1. An authentication apparatus comprising:
a first unit accepting moving image data having a plurality of pieces of still image frame data, the still image frame data including an image of multiple individuals and an image of a device that requires an authentication;
a detection unit detecting a move locus of multiple individuals based on the moving image data, the move locus being determined by a sequence of regions where the image of the multiple individuals is recognized in the plurality of pieces of the still image frame data; and
a second unit executing individual determination processing of determining an individual of the multiple individuals in one piece of the still image data based on the detected move locus and a distance measured between (a) a region where the individual of the multiple individuals is recognized and (b) the device that requires an authentication in the one piece of the still image frame data, wherein a result of the individual determination processing is provided for predetermined authentication processing,
wherein the individual of the multiple individuals that is closest to the device that requires an authentication is selected as an individual to be authenticated.

2. The authentication apparatus according to claim 1, wherein the detection unit detects multiple moving bodies from the moving image data, and
wherein the detection unit detects the move locus of a moving body of the multiple moving bodies satisfying a predetermined condition, of the detected multiple moving bodies as the move locus of the image of the individual of the multiple individuals.

3. The authentication apparatus according to claim 2, wherein the detection unit detects the move locus of the image of the individual of the multiple individuals based on color information.

4. The authentication apparatus according to claim 1, further comprising:
a third unit detecting a face portion of the individual of the multiple individuals from at least a part of the plurality of pieces of still image frame data, wherein the detection unit detects the move locus of the image of the individual of the multiple individuals based on the detected face portion information.

5. An authentication method for causing a computer to execute, comprising:
accepting moving image data comprising a plurality of pieces of still image frame data, the still image frame data including an image of multiple individuals and an image of a device that requires an authentication;
detecting a move locus of the image of the multiple individuals based on the moving image data, the move locus being determined by a sequence of regions where the image of the multiple individuals is recognized in the plurality of pieces of the still image data;
executing individual determination processing of determining an individual of the multiple individuals in one piece of the still image data based on the detected move locus and a distance measured between (a) a region where the individual of the multiple individuals is recognized and (b) the device that requires an authentication in the one piece of the still image frame data; and
providing a result of the individual determination processing for predetermined authentication processing,
wherein the individual of the multiple individuals that is closest to the device that requires an authentication is selected as an individual to be authenticated.

6. A non-transitory computer readable medium storing a program causing a computer to execute a process for authentication, the process comprising:
accepting moving image data comprising a plurality of pieces of still image frame data, the still image frame data including an image of multiple individuals and an image of a device that requires an authentication;
detecting the move locus of the image of the multiple individuals based on the moving image data, the move locus being determined by a sequence of regions where the image of the multiple individuals is recognized in the plurality of pieces of the still image frame data;
executing individual determination processing of determining an individual of the multiple individuals in one piece of the still image data based on the detected move locus and a distance measured between (a) a region where the individual of the multiple individuals is recognized and (b) the device that requires an authentication in the one piece of the still image frame data; and
providing a result of the individual determination processing for predetermined authentication processing,
wherein the individual of the multiple individuals that is closest to the device that requires an authentication is selected as an individual to be authenticated.

* * * * *